United States Patent [19]
Hilbert et al.

[11] Patent Number: 5,317,160
[45] Date of Patent: May 31, 1994

[54] LASER PULSED FIBER OPTIC NEUTRON DETECTOR

[75] Inventors: Lee A. Hilbert, Athens; George R. Edlin; Leon H. Riley, both of Huntsville; Thomas G. Miller, Madison; Wilford W. Gebhart, Decatur; Charles L. Johnson, Madison, all of Ala.

[73] Assignee: The United States of America as represented by the Secretary of the Army, Washington, D.C.

[21] Appl. No.: 65,260

[22] Filed: May 21, 1993

[51] Int. Cl.$^5$ .............................. G01T 3/00; G01T 5/00
[52] U.S. Cl. ........................... 250/390.12; 250/390.07; 250/472.1
[58] Field of Search ............... 250/472.1, 473.1, 474.1, 250/390.12, 390.07, 390.01

[56] References Cited

U.S. PATENT DOCUMENTS 5,117,120  5/1992  Margaliot et al. ............... 250/472.1

FOREIGN PATENT DOCUMENTS 159671  8/1985  Japan ........................... 250/390.01

OTHER PUBLICATIONS

J. G. Timothy et al, "Multi-Anode Microchannel Arrays", IEEE Transactions on Nuclear Science, vol. NS-28, No. 1 Feb. 1981, pp. 689–697.
W. R. Binns et al, "Scintillator-Fiber Charged-Particles Track-Imaging Dectector", Nuclear Instruments and Methods 216, (1983) pp. 475–480.

*Primary Examiner*—Carolyn E. Fields
*Attorney, Agent, or Firm*—Hugh P. Nicholson; Freddie M. Bush

[57] ABSTRACT

A laser pulse fiber optic neutron detector which is capable of discriminating against background neutrons and gamma rays while measuring both the energy of an incoming neutron and its direction has a sensor having a plurality of vertically-stacked organic fiber light pipes and a reflector at one end of the light pipes. Ionized tracks in the light pipes caused by neutron radiation are detected by directing pulsed laser radiation into one end of the light pipes and detecting the laser radiation backscattered and reflected from the light pipes.

5 Claims, 2 Drawing Sheets ns can be measured. The amplitude of the reflected laser pulse is a measure of the magnitude of the ioniza-

LASER PULSED FIBER OPTIC NEUTRON DETECTOR

DEDICATORY CLAUSE

The invention described herein may be manufactured, used, and licensed by or for the Government for governmental purposes without the payment to us of any royalties thereon.

BACKGROUND OF THE INVENTION

Neutron detectors that could be deployed in space for use with a neutron particle beam system must be relatively light weight and should be able to discriminate against background neutrons and gamma rays. In order to discriminate against background neutrons, neutron detectors should be able to measure both the energy of an incoming neutron and its direction. The degree to which the detector can perform both of these functions is a measure of its usefulness in a neutron particle beam system. The neutron detector should be relatively simple and reliable since it may remain in space unattended for very long periods of time. Presently there is not a neutron detector system available which meets the above criteria.

SUMMARY OF THE INVENTION

A laser-pulsed fiber optics light pipe neutron detector that discriminates against gamma rays. The sensor portion of the detector is constructed of hydrogen-rich organic fiber light pipes which are grouped together to form a bundle. Neutrons incident on the light pipe bundle cause elastic-scattering of protons in the light pipes. These recoil protons can traverse through several light pipes in the bundle leaving ionization tracks in the light pipes. These ionized tracks are sensed by observing discontinuities in the backscatter resulting from the laser pulses which propagate down each of the light pipes. The angle of incidence of the neutrons are determined from the path of the recoil protons. The path of the recoil protons are determined by injecting a laser pulse into each light pipe and sensing the resultant backscatter. The path of the recoil proton can be determined from the sensed backscattered discontinuities in each of the light pipes traversed by a recoil proton.

DETAILED DESCRIPTION OF THE INVENTION

Figure 1:
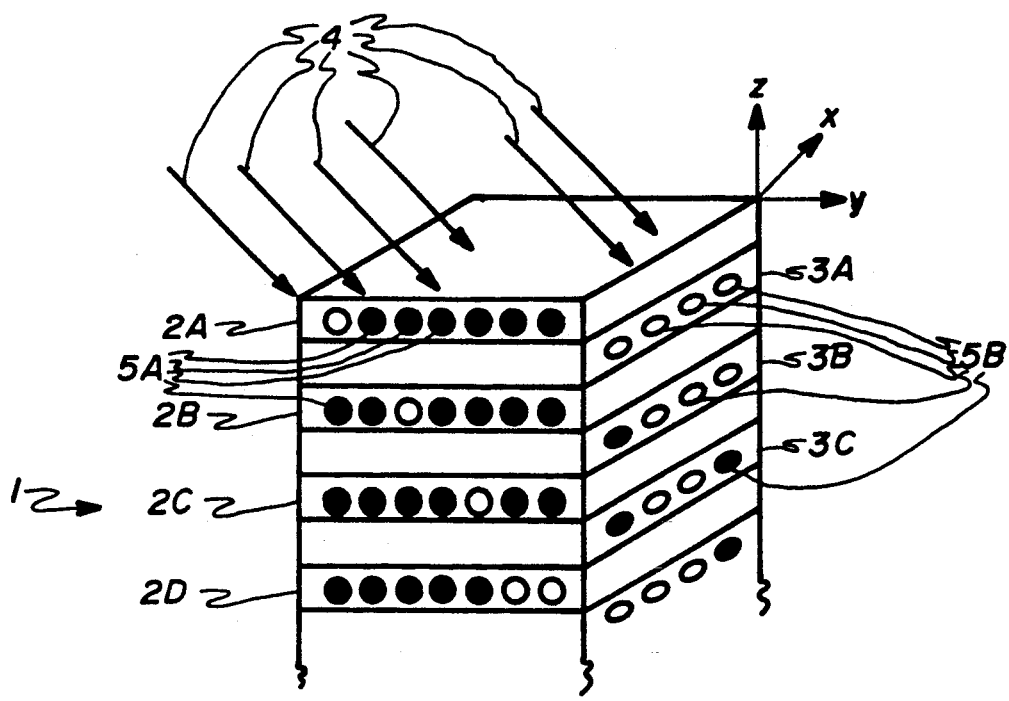
FIG. 1 shows a preferred embodiment of the fiber optic neutron sensor, illustrating the arrangement of the light pipes in the sensor.

Referring to the drawings, wherein like numbers refer to like parts, there is shown in FIG. 1 an organic fiber optic light pipe sensor 1 with layers of light pipes arranged in parallel planes. Each layer 2 of light pipes has fiber optics 5A therein arranged in parallel. Therefore multiple layers 2A, 2B, 2C, etc. have respective parallel fibers 5A arranged in parallel therein. Each layer 2 is separated by a parallel layer 3 having fiber optic light pipes 5B arranged in parallel. Therefore the respective layers 3A, 3B, etc. have similar fibers 5B arranged in parallel. The light pipes 5B are laid in a direction which is perpendicular to the direction of light pipes 5A in the adjacent layer. However, the direction of the light pipes in all layers may be parallel. Incoming neutrons 4 incident on the light pipes, fibers 5, which are hydrogen-rich, cause elastic scattering of protons in the light pipes. These protons commonly referred to as recoil protons, traverse several light pipes leaving in their wake ionized tracks in the light pipes, each recoil proton leaving one ionization track before it stops. The number of light pipes traversed by a recoil proton is indicative of the recoil proton's energy.

Figure 2:
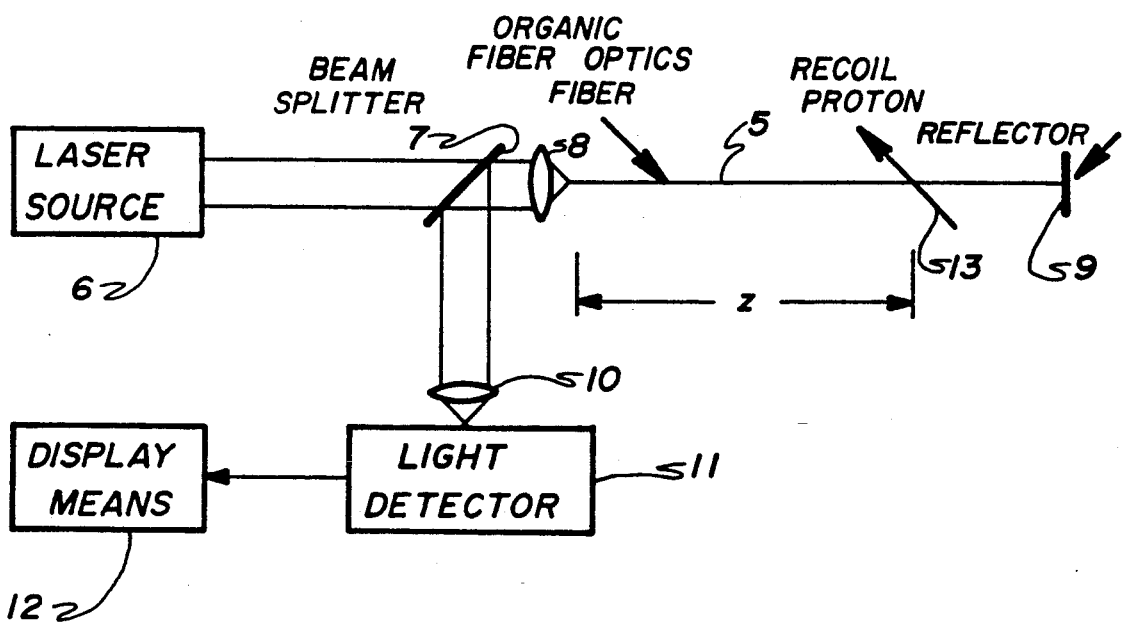
FIG. 2 illustrates the operation of the neutron detector.

FIG. 2, shows the principal of operation of the neutron sensor or detector. Shown is a typical light pipe 5 of a bundle of light pipes when neutrons are incident on the typical light pipe. Laser source 6 such as a diode laser generates a laser pulse that is passed through beam splitter 7, through a first focus means 8 and then injected into the first end of organic optic fiber light pipe 5. The laser pulse propagates down the light pipe to a reflector 9 mounted on the rear or second end of pipe 5 and is reflected back to the beam splitter 7. The reflected laser pulse is directed by beam splitter 7 to a second focus means 10 and then to a light detector 11, which is coupled to a display means 12. A recoil proton 13 is released during an elastic collision of any incident neutron with the laser pulse and is shown, typically, at a distance "z" along the fiber from the first end of the light pipe. The display means 12 displays both the reflected laser pulse and the backscatter response as a function of time.

Figure 3:
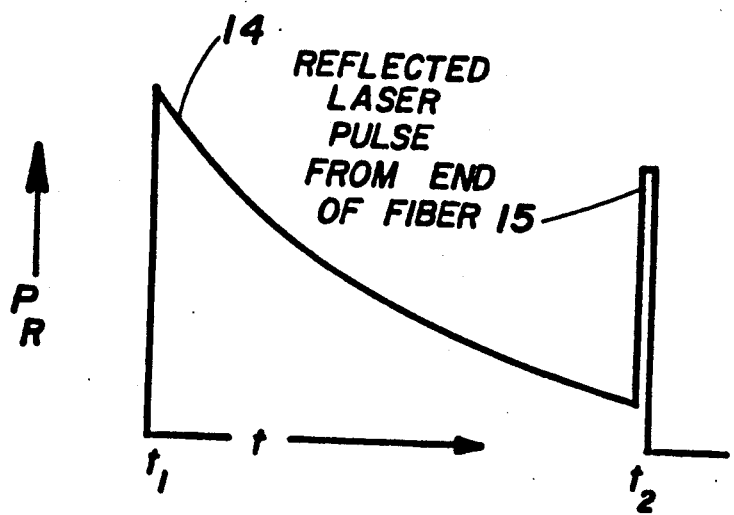
FIG. 3 shows the backscatter curve when no proton tracks are present in the light pipe.
Figure 4:
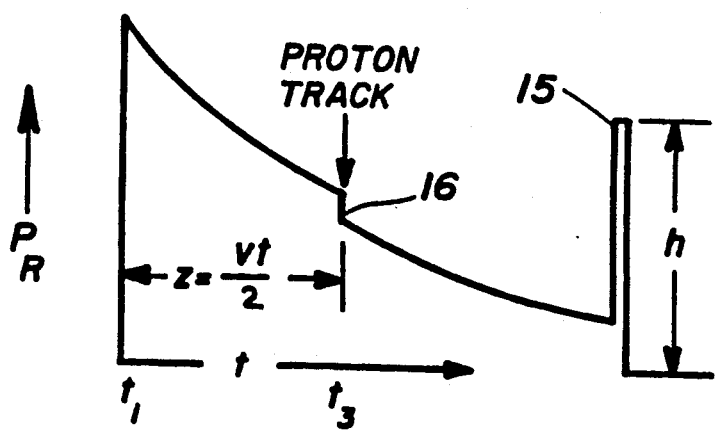
FIG. 4 shows the backscatter curve when a proton ionization path is present in the light pipe.

FIGS. 3 and 4 show typical displays expected of reflected laser pulses and backscatter responses as a function of time. FIG. 3 shows a backscatter response curve 14 and a reflected laser pulse 15 when there is no recoil proton $P_R$ passing through the light pipe. At time t equal t1, the incident laser pulse P is inserted into the first end of the light pipe. The reflected laser pulse 15 is shown at t equal t2. No proton tracks are present, therefore, the backscatter curve is continuous from beginning to the start of the reflected laser pulse. FIG. 4 shows the expected backscatter response with a discontinuity 16 at t equals t3 indicating the track of a recoil proton $P_R$. As the recoil proton passes through the fiber optic light pipe it leaves an ionized path in its wake. The ionization path leaves density fluctuations in the light pipe. As the laser pulse passes through the density fluctuations, additional energy from the ionized path in addition to the backscatter losses results in the discontinuity 16 in the backscatter time distribution curve. The distance of the proton track from the first end of the light pipe is z equal to the velocity (v) of the propagated laser pulse multiplied by the time interval t3 minus t1 divided by 2 or ($z=v(t3-t2)/2$).

The discontinuity in the backscatter curve is measured by directing a laser pulse into each fiber of the bundle and measuring the time interval between injection of the laser pulse and the change in signal due to the density fluctuation. Since a laser pulse is injected into each fiber optic light pipe in the bundle, the depth of penetration of recoil protons into the bundle of light pipes can be measured. The amplitude of the reflected laser pulse is a measure of the magnitude of the ionization path and also a measure of the energy deposited by the recoil proton. The depth of penetration of recoil protons through the bundle of light pipes and the "Z" coordinate (shown in FIG. 1) for the ionization track indicate the magnitude of energy and angle of incidence of the detected neutron.

Thus, the pulsed laser generator fiber optics light pipe neutron sensor utilizes the backscattering signal from a laser generator coupled to an organic fiber lightpipe to measure the Z coordinate of the proton track. By using many individual fibers to form a bundle the complete path of a recoil proton elastic collision can be tracked, giving information on the neutron's initial direction.

Obviously variations of the present invention are possible in the light of the above teachings. It is therefore to be understood that within the scope of the appended claims the invention may be practiced otherwise than as specifically described.

We claim:

1. A laser-pulsed fiber optic neutron detector comprising: means for generating laser pulses, a sensor having a plurality of vertically-stacked layers of organic fiber light pipes, each of said light pipes having a first end and a second end, and said sensor being suitably positioned to receive laser pulses at said first end of each of said light pipes, reflecting means located at said second end of each of said light pipes for reflecting laser pulses injected into said light pipes, detecting means suitably positioned to detect backscatter from laser pulses as said pulses travel within said light pipes and are reflected by the reflecting means at said second end, and display means coupled to said detecting means to receive backscatter and reflected laser pulses from said detector means, for displaying the backscatter and the reflected laser pulse information.

2. A laser-pulsed fiber optic neutron detector as set forth in claim 1, wherein said generating means comprises a laser generator suitable for generating laser pulses, focusing means positioned for focusing and transmitting laser pulses to said first end of said light pipes and a beam splitter, said beam splitter being positioned between said laser generator and focusing means to receive laser pulses from said laser generator and transmit said pulses to said focusing means.

3. A laser-pulsed fiber optic neutron detector as set forth in claim 2, wherein said detecting means comprises a light detector, and a second focusing means, said second focusing means being suitably positioned between said beam splitter and said light detector to receive backscatter and reflected laser pulses and direct the backscatter and reflected laser pulses to said light detector, and a suitable displaying device coupled to said light detector to receive backscatter and reflected laser pulse information from said light detector.

4. A laser-pulsed fiber optic neutron detector as set forth in claim 3 wherein said displaying device is suitable for displaying backscatter and reflected pulse information received from each light pipe of the sensor as a function of time.

5. A laser-pulsed fiber optic neutron detector as set forth in claim 3 wherein said sensor comprises layers of fiber optic light pipes that are perpendicular to adjacent layers of fiber optic light pipes.

* * * * *